United States Patent [19]

Lange et al.

[11] 3,979,726

[45] Sept. 7, 1976

[54] APPARATUS FOR SELECTIVELY CLEARING A CACHE STORE IN A PROCESSOR HAVING SEGMENTATION AND PAGING

[75] Inventors: Ronald Edwin Lange, Phoenix; Riley H. Dobberstein, Scottsdale, both of Ariz.; Steven Hugh Webber, Groton, Mass.

[73] Assignee: Honeywell Information Systems, Inc., Phoenix, Ariz.

[22] Filed: Apr. 10, 1974

[21] Appl. No.: 459,504

[52] U.S. Cl. .......................................... 340/172.5
[51] Int. Cl.² ...................................... G06F 13/00
[58] Field of Search ............................. 340/172.5

[56] References Cited
UNITED STATES PATENTS

| | | | |
|---|---|---|---|
| 3,588,829 | 6/1971 | Boland | 340/172.5 |
| 3,588,839 | 6/1971 | Belady et al. | 340/172.5 |
| 3,800,286 | 3/1974 | Brown et al. | 340/172.5 |
| 3,800,291 | 3/1974 | Cocke et al. | 340/172.5 |
| 3,800,292 | 3/1974 | Curley et al. | 340/172.5 |
| 3,840,862 | 10/1974 | Ready | 340/172.5 |
| 3,845,474 | 10/1974 | Lange et al. | 340/172.5 |
| 3,848,234 | 11/1974 | MacDonald | 340/172.5 |
| 3,896,419 | 7/1975 | Lange et al. | 340/172.5 |

*Primary Examiner*—Raulfe B. Zache
*Attorney, Agent, or Firm*—E. W. Hughes; William W. Holloway, Jr.

[57] ABSTRACT

In a data processing system that uses segmentation and paging to access data information such as in a virtual memory machine, the cache store need not be entirely cleared each time an I/O operation is performed or each time the data in the cache has a possibility of being incorrect. With segmentation and paging, only a portion of the cache store need be cleared when a new page is obtained from the virtual memory. The entire cache store is cleared only when a new segment is indicated by the instruction. The cache store is selectively cleared of the information from the page whose data information is no longer needed by addressing each level of an associative tag directory to the cache store. The columns of each level are compared to the page address and if a comparison is signaled that column of the addressed level is cleared by clearing the flag indicating the full status of the column in the addressed level. Each level of the tag directory is addressed.

8 Claims, 10 Drawing Figures

APPARATUS FOR SELECTIVELY CLEARING A CACHE STORE IN A PROCESSOR HAVING SEGMENTATION AND PAGING

BACKGROUND OF THE INVENTION

This invention relates to electronic digital data processing systems and in particular to processors which incoporate a cache memory store having a selective clearing operation for use with a data processor accessing a virtual memory by the use of segmentation and paging operations.

FIELD OF THE INVENTION

A cache memory store is a small easily accessible memory store located within the processor of a data processing system where the cache store is a fraction of the size of the main memory but permits faster access to stored data information than access to the main memory store. Operands and instructions, hereinafter generically termed data words, are fetched from the main memory and stored in the cache store. The processor then accesses the cache store first for the required data words. The data words stored in the cache store are obtained from the first access of the processor to the main memory store. The accessed data words are used by the processor and are stored at the same time in the cache store.

The cache store efficiency depends upon the processor using that same data words a second and possibly a multiple number of times during the same program. There are times such as when an entire program is completed that the best usage of the cache store is to clear the cache store completely awaiting the first usage of data words from the next program. This is perhaps the most efficient clearing of of the cache store where the only known quantity is the program that is being processed. However, in the use of a data processing system containing segmentation and paging for accessing the memory store, another known quantity is entered into the program that is once a segment is no longer useful, the entire cache store can be cleared since a segment is generally of a much larger size than the cache store. The segment in the segmentation retrieval of memory store is divided into smaller sections generally called pages which are commonly 1,000 data words, which is smaller than the size of the cache store. Therefore, a selective clearing would be advantageous if the instruction being processed determined that a page of data words is no longer needed and a new page of the same segment is required.

DESCRIPTION OF THE PRIOR ART

A common clearing operation for a cache store is to clear the entire cache store on all external interrupt operations. These interrupt operations indicated that possibly the data in the main memory store has been changed by the operations of the input/output controller and therefore the data in the cache store may be incorrect. Although this type of clearing is perhaps mechanical, it is positive and causes considerable unnecessary clearing of the data information from the cache store. Possibly only 50% of the I/O operation is input oriented which would change the backing store or main memory store, and only a small portion of the time would this data be resident in the cache store. The clearing action clears all of the cache store, therefore, much data information is lost and must be retrieved again on the next access into the main memory store.

The use of a cache store in a multiprocessor mode poses additional problems. Only one processor answers external interrupt signals. The clearing of the cache store every time a processor enters into a gating routine in the main memory store is an improvement over the clearing of the cache store on every input/output operation. This improvement to the clearing operation cleared the cache store for the protective gating routine and its tables in the main memory store and also for slave programs executed alternately on each processor. This improvement to the cache store clearing operation is disclosed in a U.S. Pat. application Ser. No. 413,089 filed on Nov. 5, 1973, entitled "Cache Store Clearing Operation for a Multiprocessor Mode" and assigned to the same assignee as the present invention which issued on Oct. 29, 1974 as U.S. Pat. No. 3,845,474.

The above prior art methods perform an effective job of clearing the cache store on operations where a clear cache store is possibly required, but the above methods clear the cache store an excessive number of time. Accordingly, an object of the present invention is to provide an economical clearing apparatus for a cache store memory which selectively clears areas of the cache store.

SUMMARY OF THE INVENTION

A data processing system is provided in which the absolute address preparation is performed with the high order portion of an effective data address and a base register in the usual manner. A page address of the segmentation and paging data retrieval apparatus is also selectively switched into the data processing system. In parallel, a set of address tags are read from a cache tag directory addressed by the intermediate portion of the address which also identifies a corresponding set of data words in the cache store. The cache tag directory, the cache store, and the control logic are made a part of the central processor.

Associated with the tag directory is a status indicator apparatus storing a full/empty signal or status indication for each level or block of each column of the tag directory. The status indicator apparatus indicates the entry of valid data into the cache store unit.

In a data processing system using segmentation and paging methods of data retrieval, two methods of clearing the cache store are used. Whenever an instruction to clear the segmentation associative memory storing the addresses of the segments in main memory store is encountered, the entire cache store is cleared by clearing the full/empty storage unit pointing to the tag directory of the cache store. Whenever an instruction is sensed to clear a page of data words from the page associative memory, only the data in the cache store referenced by that page address is cleared. The addresses to data placed in the cache store is stored in a tag directory comprising a plurality of $n$ columns and a plurality of $m$ levels or blocks. The tag portion, the higher order bits of the absolute address of $i$ data words placed in the cache memory are sequentially placed into the blocks of the columns corresponding to the intermediate order of bits of absolute address, determined by the level, or block, status signals A–D. To seek data information from the cache store, the levels of the tag directory are addressed by the cache address. The information retrieved from the columns of the addressed level is compared with the actual address of the data required and if a comparison is signaled, the data information is located in the cache store and is retrieved for use by the processor.

This same sequence is used for locating the data information to be cleared in the cache store. To clear a page location, the page address is directed to the comparator and the cache level address is incremented in turn to address each level, or block, sequentially. If a comparison is sensed in any one of the four blocks of any addressed column, the full/empty flag bit is cleared. The full/empty flag bit is sequentially addressed by this same level address signals directed to the tag directory. Clearing the full/empty bits designates that the data words remaining in the cache store is invalid and therefore is to be replaced.

It is, therefore, an object of the present invention to provide an enhanced clearing operation for selectively clearing a cache store of valid data information.

It is a more particular object of the present invention to provide a clearing apparatus which clears the cache store by comparing selected addresses to be cleared with tag addresses stored in a tag directory to a cache store.

It is another object to provide a cache memory store capability in a data processing system which supports segmentation and paging schemes for retrieving data information.

These and other objects of the present invention will become apparent to those skilled in the art as the description proceeds.

BRIEF DESCRIPTION OF THE DRAWINGS

The various novel features of this invention, along with the foregoing and other objects, as well as the invention itself both as to its organization and method of operation, may be more fully understood from the following description of an illustrated embodiment when read in conjunction with the accompanying drawings, wherein.

DESCRIPTION OF THE PREFERRED EMBODIMENT

Figure 1:
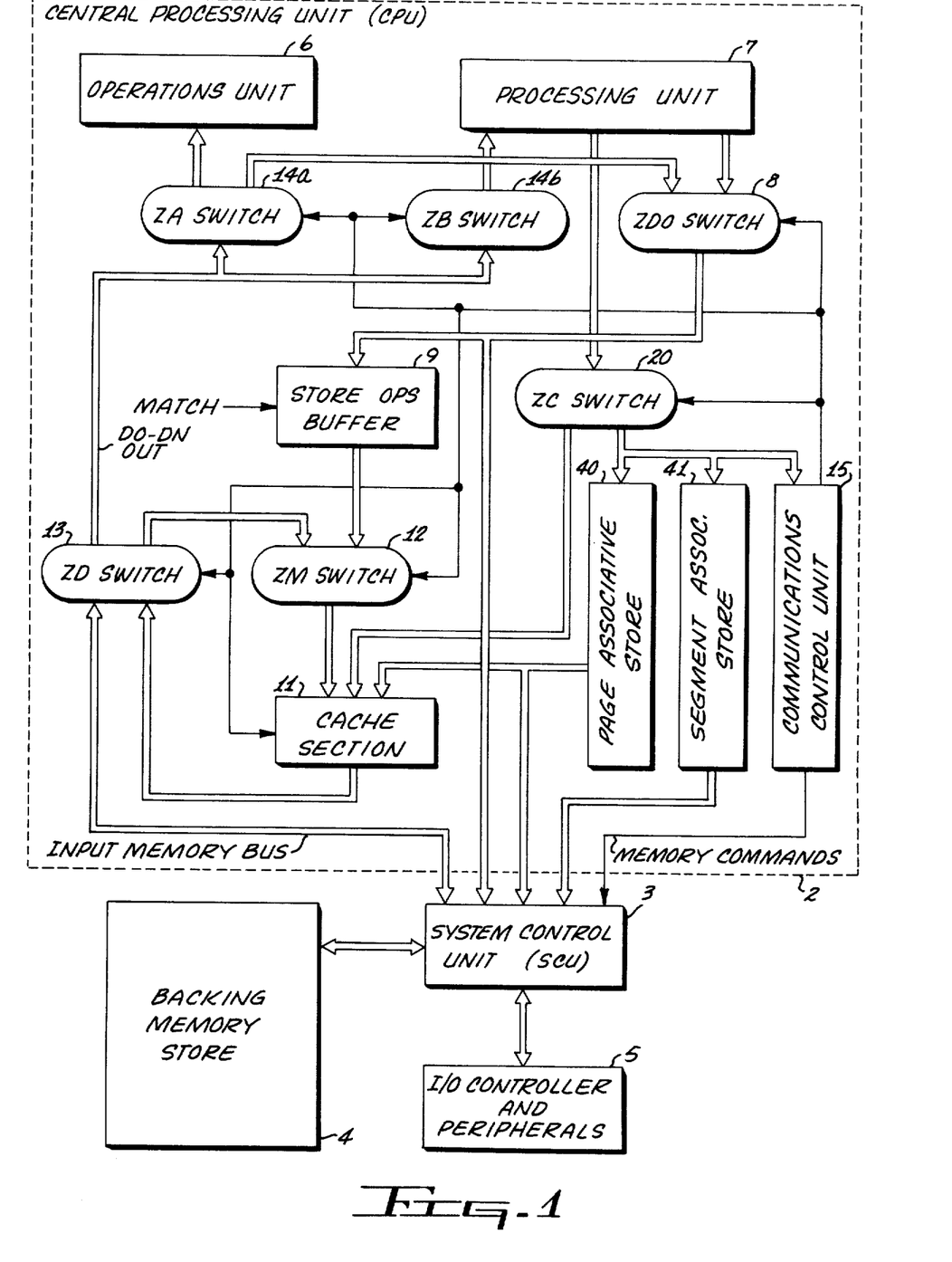
FIG. 1 is a block diagram of a data processing system including a cache store in a central processing unit.

A representative data processing system configuration is shown in FIG. 1. The data processing system shown includes a central processing unit (CPU) 2, a system control unit (SCU) 3, and a backing memory store 4. Communication with a set of peripherals is controlled through a block 5 labelled I/O controller and peripherals. The system control unit 3 controls the communication among the units of the data processing system. Thus, the peripherals communicate with the backup memory store 4 and the CPU 2 via the I/O controller 5 while the SCU 3 controls access to the backup memory store 4 and the central processing unit 2.

The CPU 2 includes an operations unit 6 performing arithmetic and logic functions on operands fetched from a memory store in accordance with instructions also fetched from the memory store. A processing unit 7 represents the further logic controls and operations performed by the CPU. The CPU 2 according to the present invention includes as part of its memory store a cache store with associated control logic shown as a cache section 11. Various data bus switches perform the data interface functions of the CPU 2 and include a ZDO switch 8, a ZM switch 12, a ZD switch 13, a ZA switch 14a and a ZB switch 14b. The control of the interfaced functions of the CPU 2, including preparation of absolute addresses, are performed by a communication control unit 15. A store operand buffer 9 provides an intermediate register storage between the processing unit 7 and the cache section 11.

The dual lines shown in FIG. 1 show the path taken by the data information while the control lines controlling the communication is shown via a single solid line.

The ZD switch 13 controls the entry of data into the processor 2 over the input memory bus. The data is switched into either the operations unit 6 by activating the ZA switch 14a, into the processing unit 7 by activating the ZB switch 14b, or into the cache section 11 by activating the ZM switch 12, or into any combination by activating a combination of the data bus switches. With the cache section 11 within the processor itself, the processor can signal the SCU3 to transfer a block of i words (4 in the present embodiment) into the cache section 11 while transferring one word to the operations unit 6. One word will be transferred via the input memory bus and the ZD switch 13 and via the ZA switch 14a into the operations unit 6. At this time the ZM switch 12 is also activated to store the word into the cache section 11. The operations unit 6 works on the data word with ZA switch 14a closed. The ZD switch 13 and the ZM switch 12 remain open to accept the remaining words of the block into the cache section 11. The operations unit 6 and/or the processing unit 7 may not be made aware of the block transfer except for the initial memory retrieval signal stored by the communications control unit 15.

The selective clear of the present invention is shown in the present embodiment of a segmentation and paging technique for accessing the backing memory store 4. To address the backing memory store, a page associative store 40 and a segment associative store 41 need to be accessed for locating the address of the segments and the pages of the segments in the backing memory store 4. Both associative stores are tag directories pointing to addresses in the backing memory store and containing an identification of the segments of data and the pages of the segments that have been retrieved from other memory stores. When the CPU has completed usage of pages of the segments and of the segments themselves, a swapping procedure is followed which clears the page or the segment from storage in the associative stores thereby effectively clearing the page and segments from the backing memory store. The next page or segment of data information is then retrieved from the memory store, such as the virtual memory store, and placed into the backing memory store with the identification again stored in the page associative store and the segment associative store.

As shown in FIG. 1 the cache section 11 is connected via an address bus to the page associative store 40. According to the present invention the cache section 11 can be selectively cleared of all information stored in the cache store by referring to the page of data information stored in the page associative store. In the present embodiment, the cache section 11 can store up to 2 K words of data information and the maximum size of a single page of data information is 1 K of data. Therefore, at most one page would use one half of the cache store. The selective clearing of cache will be described further in later figures.

The cache store of the cache section 11 is a "look-aside memory" or high-speed buffer store. The cache store provides a fast access to blocks of data previously retrieved from the backup memory store 4 and possibly updated later. The effective access time in the cache store is obtained by operating the cache store in parallel to existing processor functions. Successful usage of the cache store requires that a high ratio of storage fetches for data information can be made from the cache store rather than requiring that the processor access the backup memory store directly. In any event, the search of the cache store for the possible quick retrieval of the data information should not delay the retrieval from the backup memory store. The system according to the preferred embodiment checks the cache store while the generation of a potential retrieval from the backup memory store is being processed. If the data information is found in the cache store, the retrieval from the backup memory store is blocked. The operations unit 6 and the processing unit 7 obtain the data information from the cache section 11 via the ZD switch 13 in a much shorter period of time without the unit being aware of the source. For a more complete description of the cache section communicating control unit reference is made to a copending U.S. Pat. application, Ser. No. 393,358, filed on Aug. 31, 1973 and assigned to the same assignee as the present invention which issued of Feb. 11, 1975 as U.S. Pat. NO. 3,866,183. A block diagram of the cache section 11 including the cache store 10 and portions of the communication control unit 15 is shown in FIG. 2.

Figure 2:
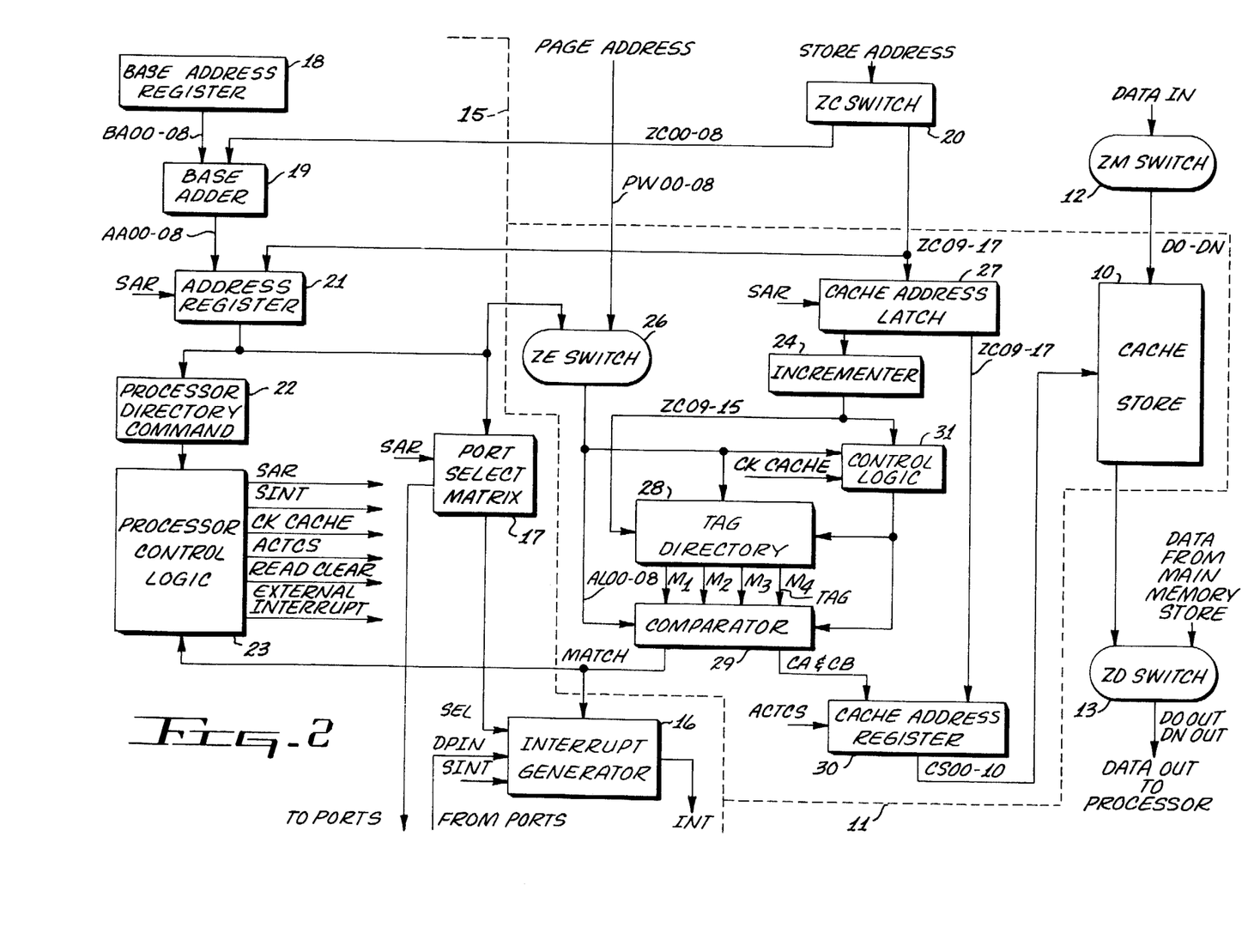
FIG. 2 is a block diagram of a communications control apparatus and a cache section of the central processing unit shown in FIG. 1.

Referring now to FIG. 2, the standard data processing communication control section 15 includes an interrupt generator circuit 16, a port select matrix circuit 17, a base address register 18, a base address adder 19, an address register 21, a processor directory command 22 and a processor control logic 23 which represents the control logic of the processor. A ZC switch 20 controls the input of the store address for retrieval of the data information from the memory store which may be either the cache store 10 or the backing memory store 4 of FIG. 1. The store address is obtained from the processing unit to retrieve the data information according to the address signals. The cache section 11 includes the cache store 10, a ZE switch 26, a cache address latch register 27, a tag directory 28, a comparator 29, a cache address register 30, and associated counters and control logic shown as block 31.

Figure 4:
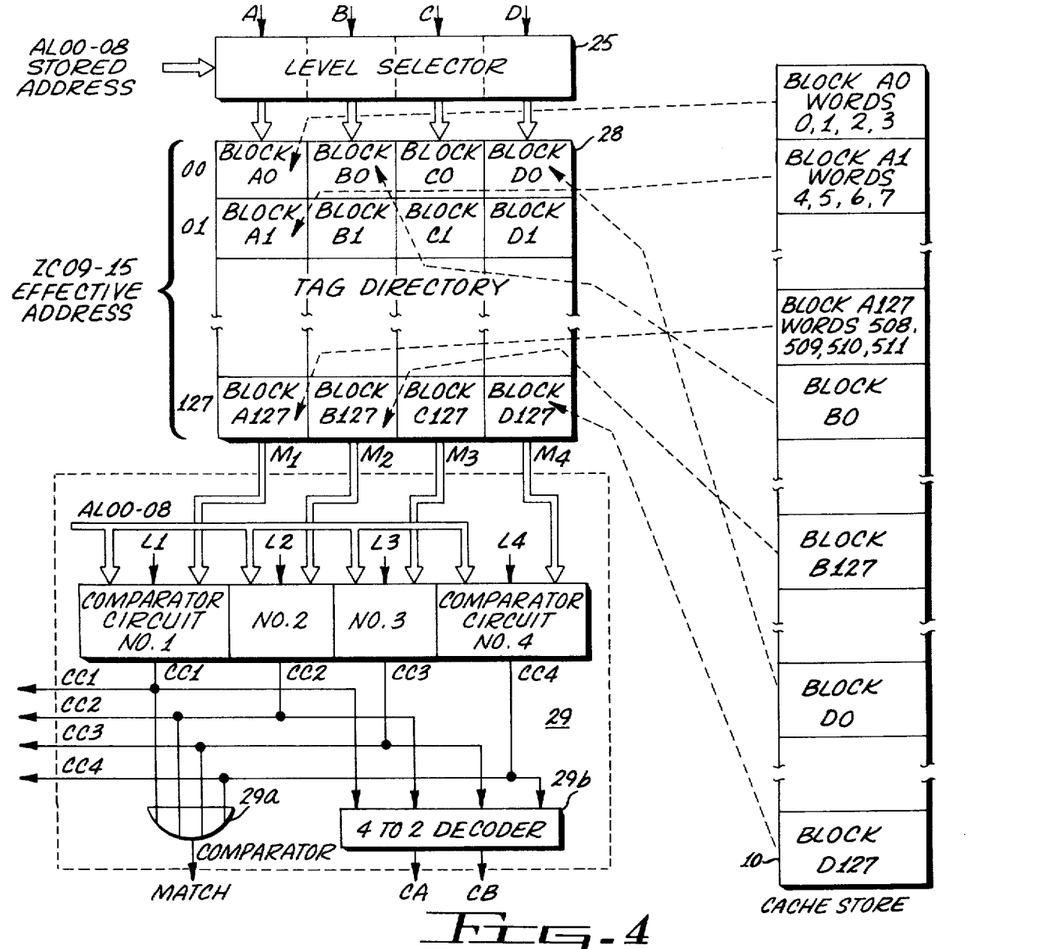
FIG. 4 is a block diagram of a tag directory with a comparator and shows the mapping strategy between the cache store and its tag directory shown in FIG. 2.

The cache or tag directory 28 identifies the storage section or block in the cache store 10. TAG words, or tags, the higher order bits of the absolute address, in a preferred embodiment bits ZC00 through ZC08 as illustrated in FIG. 4, are stored in the tag directory 28. The column in which a tag is stored is determined by the column number corresponding to the intermediate order bits of the absolute address, in a preferred embodiment these are bit positions ZC09 through ZC15. The lowest order bits indicate the location of each data word of the $i$ data words stored in a corresponding block of the cache store. The mapping of the tag directory 28 according to the preferred embodiment is called a four level set associative mapping. The mapping organization is shown in FIG. 4. Tag directory 28 is divided into $n$ columns and each of the $n$ columns is divided into $m$ blocks with $n$ and $m$ being integers. In a preferred example $n$ is equal to 128 and $m$ is equal to 4. The cache store 10 is divided into $m$ times $n$ blocks or in preferred example 512 blocks each block which can contain $i$ data words where $i$ is an integer and in a preferred embodiment equals 4, thus the capacity of cache store 10 is 2048 data words. Each block of the cache store maps directly into one block of the tag directory. The replacement procedure for loading new blocks into a column which is full is on a first in, first out basis and is called round robin organization (RRO).

Figure 5:
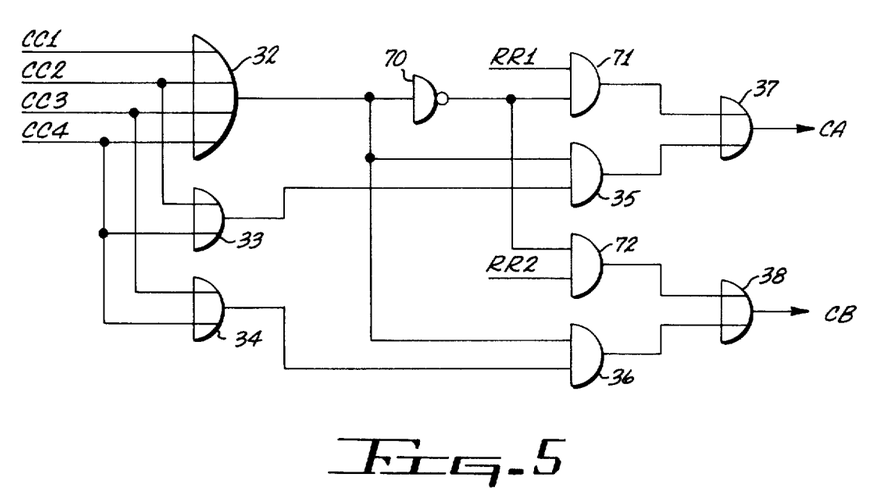
FIG. 5 is a logic diagram of the indicator apparatus control logic for the tag directory shown in FIG. 2.

The tag directory 28 is implemented as a small memory with the number of blocks equal to the number of blocks in the cache store 10. The columns of the tag directory 28 are addressed and located by the effective address signals ZC09-15. Each column has four levels in which the stored address signals AL00-08 are stored pointing to a particular block in the cache store 10. In order to locate the particular level of the tag directory and the particular location of the data information in the cache store, the round robin circuit is needed. The placement of the tag, the high order stored address signals AL00-08 into the levels, or blocks, of the tag directory 28 is controlled by a level selector 25. The level selector 25 places the AL00-08 signal into the column determined by bits ZC09–ZC15, the intermediate order bits, of the absolute address and into a block determined by output signals R1 and R2 which determine which of the block or level selection signals A, B, C, D are produced by 2 to 4 decoder 93 illustrated in FIG. 6. The round robin placement circuit for use with the present invention can be a two bit memory section which is addressed by the same signals ZC09-ZC15 as the tag directory 28. A combined full/empty memory store designating the full or empty status of each blcok of each column and a round robin counter is shown in FIG. 5 and will be discussed later.

The cache store 10 of the preferred embodiment stores 2048 data words, each word comprising k bits D0-DN in each chip section with each word length having 36 bits of information in each half of memory store, 72 bits of information in the combined sections. The cache store 10 has four levels accessed by the CA and CB address signals from the comparator 29. The readout data information signals DOOUT-DNOUT are common to all four levels.

Figure 3:
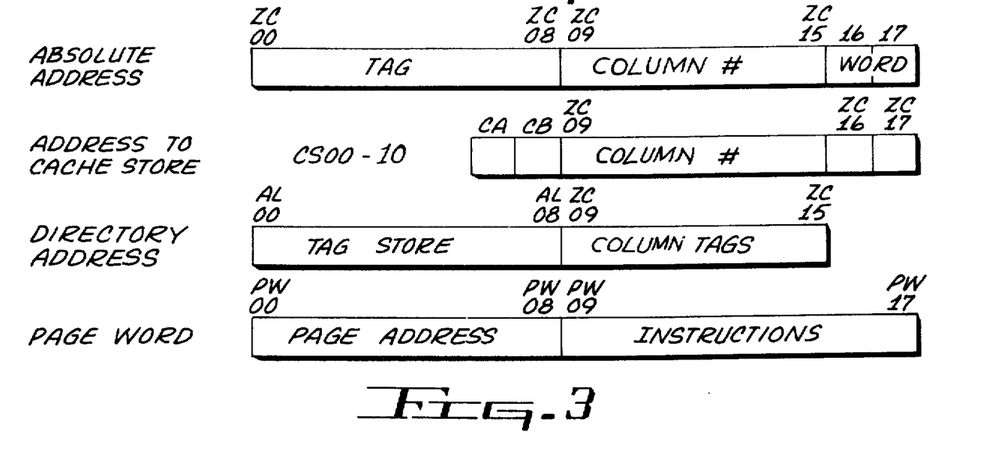
FIG. 3 is a diagram illustrating the addressing scheme used by the cache section shown in FIG. 2.

The cache store 10 is addressed by the cache address signals CS00-10 made up of the low order address signals ZC09-17 together with the CA and CB signals, see FIGS. 2 and 3. The ZC16 and ZC17 signals identify which of the four words stored in the corresponding block of cache store 10 is addressed.

The DO-DN data signals are the DATA IN signals, see FIG. 2, entered by the ZM switch 12, and the DO-OUT-DNOUT signals are the DATA OUT signals transmitted to the main registers of the processor by the ZD switch 13.

Referring now to FIGS. 2 and 4, the data information stored in the tag directory 28 is the main memory address of the data stored in the cache store 10. Only nine address bits are shown stored in the tag directory 28. These are the AL00-08 address bits which are coupled from the address register 21 through switch 26 to the tag directory. Thus by addressing the column of the tag directory 28 by the effective address ZC09-15 signals, the block word information stored in the cache store 10 is obtained. The address information stored in the addressed column is compared in the comparator 29 to the main memory store address AL00-08 signals being requested by the processor. These AL00-08 signals are available either from the address register for checking for the retrieval of data information from the cache store 10 or for comparing with the page address when the cache store is to be selectively cleared on a clear associate memory-page (CAMP) instructions, as will be described later.

The comparator 29 essentially comprises four groups of a plurality of comparing circuits, nine in the present embodiment, which compares the nine address signals from each of the four levels of the tag directory 28, the M1, M2, M3 and M4 signals, to the nine address signals AL00-08. If a comparison is made by all the signals in any nine signal comparator circuit No. 1, 2, 3 or 4, and provided the level contained valid data, the comparator 29 generates a MATCH signal from an OR-gate 29a (see FIG. 4) to inhibit interrupt generator 16 from generating an interrupt INT signal. The retrieval of data information will then be from the cache store 10 rather than from the main memory store.

The cache storage address signals CS00-10, see FIGS. 2 and 3, are developed from the comparator logic and the effective address bits ZC09-17 and are stored in the cache address register 30. The 11 bit address provides access to a 2048 data word cache storage. The eleven bit address uses address signals CA and CB from the comparator 29, developed from the comparison bits CC1-4 from the tag directory 28 and bits ZC09-17 from the effective address.

Referring now to FIGS. 4 and 5, a four to two decoder 29b of the comparator 29 comprises OR-gates 32, 33 and 34 together with AND-gates 35 and 36 to decode the comparison bit signals CC1-4. OR-gates 37 and 38 generate the address signals CA and CB either from the comparison bit signals CC1-4 on a read cache store operation or from the round robin signals RR1 and RR2 on a write cache store operation. An inverter 70 disables AND-gates 71 and 72 if any one of the comparison signals CC1-4 is enabled on a correct comparison. If no comparison signals are enabled, the AND-gates 71 and 72 each have one leg enabled in preparation of a write cache store operation. The round robin counter signals RR1 and RR2 designate the levels of the columns that are to accept the next data information address. The R1 and R2 signals are decoded by 2 to 4 decoder 93 to generate the A, B, C and D signals which are directed to the level selector 25.

The tag directory section 28 includes logic circuitry to indicate that a block of words in the cache store 10 is full and that the data is valid. The logic circuitry develops a full/empty status bit signal associated with each tag word stored in a block in tag directory 28. The cache store 10 can be cleared by resetting all of the status bit signals. The cache store 10 is completely cleared whenever a segment of data is cleared by having the central processing unit execute a clear associative memory segment (CAMS) instruction. The cache store is partially cleared whenever a page of j data words is to be cleared. In the present embodiment a page of data information is as a maximum equal to 1024 data words and the cache store contains 2k, or more accurately, 2048, words of data.

Each of the 128 columns of the tag directory 28 has a round robin (RRO) circuit pointing to the block of the corresponding column into which the next tag is to be loaded. The RRO circuit is included with the full/empty status bit signal storage in the control logic shown in FIG. 6. The RRO circuit is advanced when a new block of data words is placed into the cache store 10. The absolute address bits AL00-08, the tag, are stored into the tag directory column determined by the intermediate order bits ZC09-15. The RRO circuit comprises a two bit memory store, in a preferred embodiment, in each of a plurality of 77 addressable memory units shown in FIG. 6 together with a count adjust or skip counter circuit 95, a binary counter 94, and a two to four decoder 93 form the RRO circuit of the present invention.

Figure 6A:
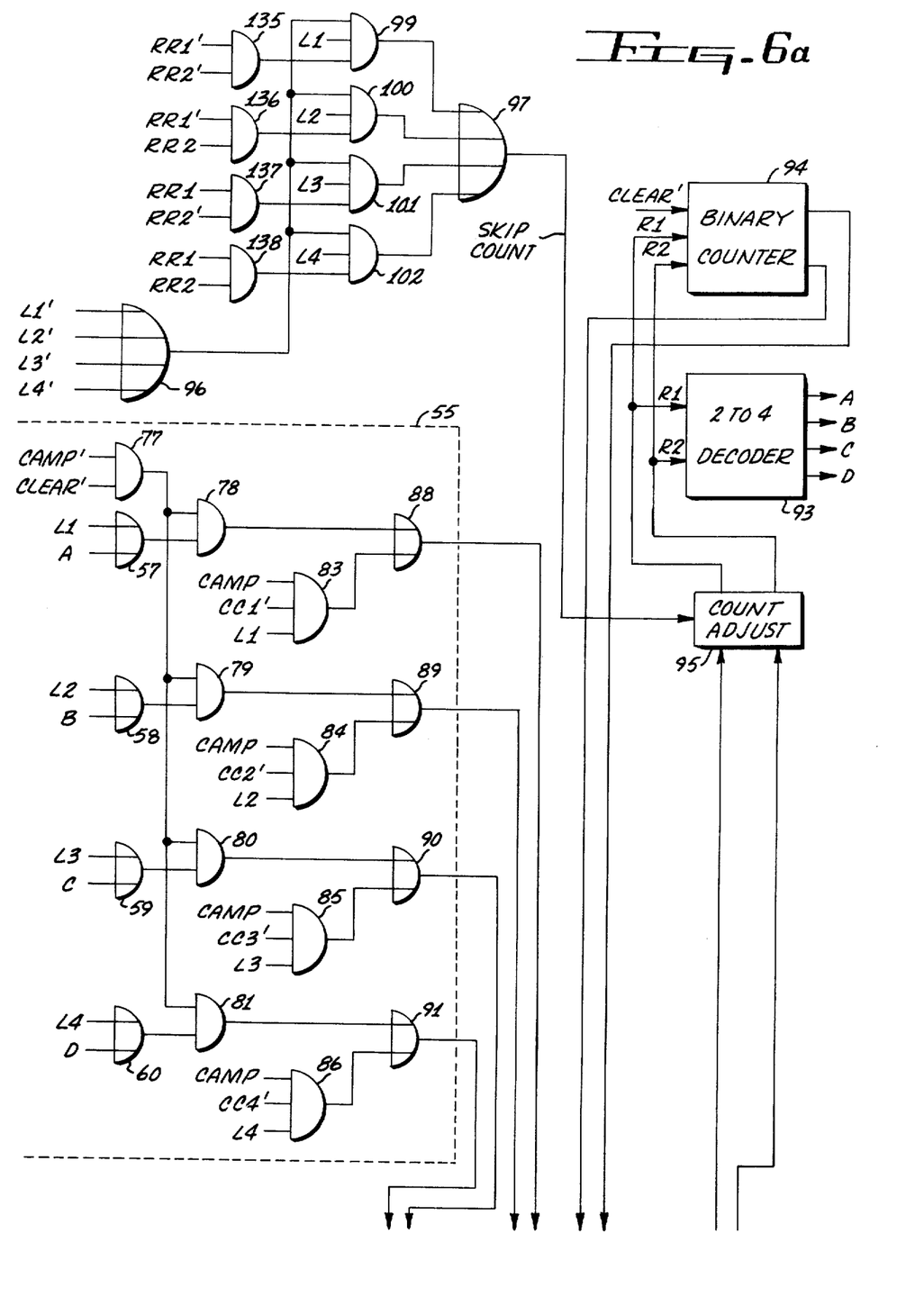
FIGS. 6a and 6b are logic diagrams of a cache store clearing circuit controlling the indicator apparatus of FIG. 5.
Figure 6B:
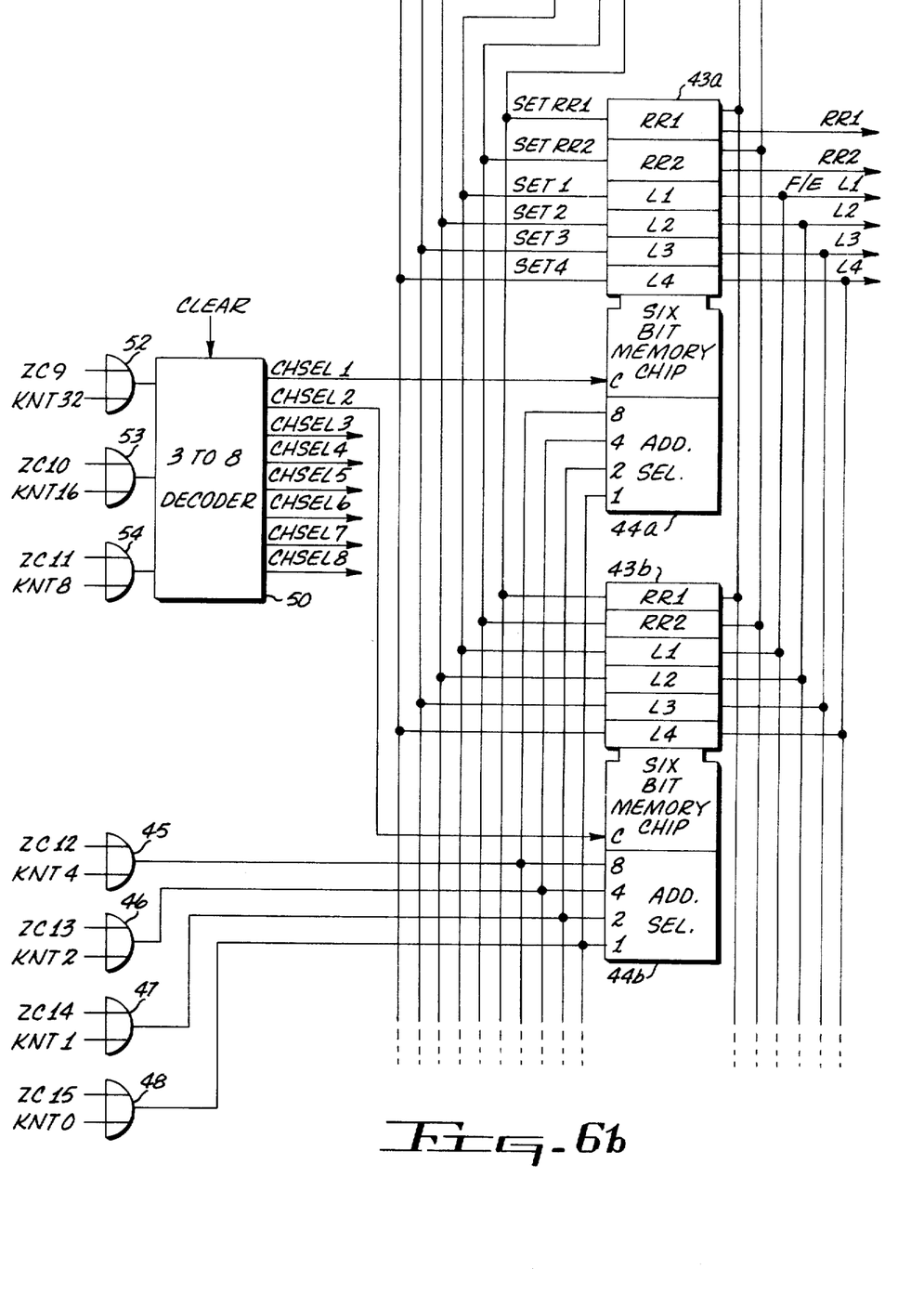

The RRO logic and the full/empty mechanism shown in FIG. 6 comprise a portion of the control logic 31 shown in FIG. 2 and control the placing and locating of the tags in the blocks of the tag directory and thus four data words, in a preferred example, into a specified location in the cache store. Two six-bit storage units 43a and 43b shown in FIG. 6 comprise a portion of the one hundred twenty eight such units included in the present embodiment. Each storate units 43 a, b, etc. contain six storage positions, RR1, RR2 and L1-L4. Each of the addressable storage units is duplicated 16 times on a memory chip with each memory chip including an address portion 44a. The six-bit memory chips 43a and 43b include an address portion, 44a and 44b, driven by a group of four address selection OR-gates 45–48. A portion of the effective address signals ZC12-15 is applied to one leg of each of the four OR-gates 45–48 while the other leg of each of the OR-gates 45–48 is driven by clear address signals KNTO-4. The clear address signals are generated by the clearing circuit shown in FIG. 7. The operation of the clearing circuit will be explained later.

Continuing with the control logic 31 circuitry of FIG. 6, the address selection OR-gates 45–48 provide 16 possible address signals. The remaining three bits of the effective address signals, bits ZC9-11 are applied to a 3 to 8 decoder 50 to provide the chip selection signals CHSEL1-8. Each chip selection signal is directed to one of the 8 memory chips. Thus, the chip select signals in combination with the effective address signals ZC12-15 individually address all 128 of the six-bit storage units.

Each of the addressable storage units 43 a, b, etc. stores in its storage elements p pointer signals, RR1 and RR2 in a preferred example and m full/empty status signals L1-L4 where $p$ and $m$, in a preferred example, are 2 and 4 respectively. The pointer and status signals are obtained from counters 55 and 94 and are stored in the addressable storage unit determined by signals ZC9-ZC15 applied to decoder 50 and OR-gates 45-48.

Each time data information is written into the cache store 10, signals R1 and R2 from the six-bit memory cell having the same effective address as the corresponding column of tag directory 28 are incremented. During a normal cache store operation, the CLEAR signal is disabled and its inverted signal CLEAR' is high or enabled. A CLEAR cache store operation resets all RR1, RR2, L1-L4 and A, B, C and D signals to zero. On the first addressing of a particular six-bit storage unit, storage unit 43a for instance, the signals ZC09-ZC11 are applied to 3 to 8 decoder 50 which produces a chip select signal CHSEL 1–8 identifying which of 8 memory chips will be enabled. The balance of the signals Z12 through Z15 are applied to the address portion 44a, 44b, etc. of the 8 memory chips so that the address selection portion of the enabled chip, selects, or enables the addressable storage unit whose address is equal to ZC09-ZC15. The enabled storage unit on the enabled chip produces the signals RR1 and RR2 which are applied to the binary counter 94 which increments them by one as well as full empty status signals L1-L4. When the counter 94 increments to a count of one this causes the 2 to 4 decoder 93 to provide a high level of signal on the A lead. The high level of signal on the A lead is coupled to the lower input lead of OR-gate 57 in the increment counter 55 thereby causing a positive voltage on the lower lead of AND-gate 78. At this same time the CAMP and CLEAR signals are low, the CAMP' and the CLEAR' signals are both high so that AND-gate 77 is enabled thereby providing a high value of signal to the upper input lead of AND-gate 78. AND-gate 78 is enabled and couples a high value of a signal through OR-gate 88 to the set 1 input lead of the six-bit storage unit 43a thereby providing an L1 signal. On subsequent addressing of memory chip 43a the binary counter provides a signal to the decoder 93 which produces a high value of B signal. This B signal is coupled through OR-gate 58, AND-gate 79 and OR-gate 89 to the set 2 input lead of the six-bit memory chip 43 thereby providing an L2 output from the chip 43a.

On subsequent addressing of the storage unit 43a locations L3 and L4 are addressed so that an output is obtained from the L3 and L4 output leads of unit 43a. The setting of four bits L1-L4 of unit 43a indicate that all four levels of the address column are full and that the associated cache store locations contain valid data. Subsequent write operations to the same addresses of unit 43a will update the cache store 10.

Figure 8:
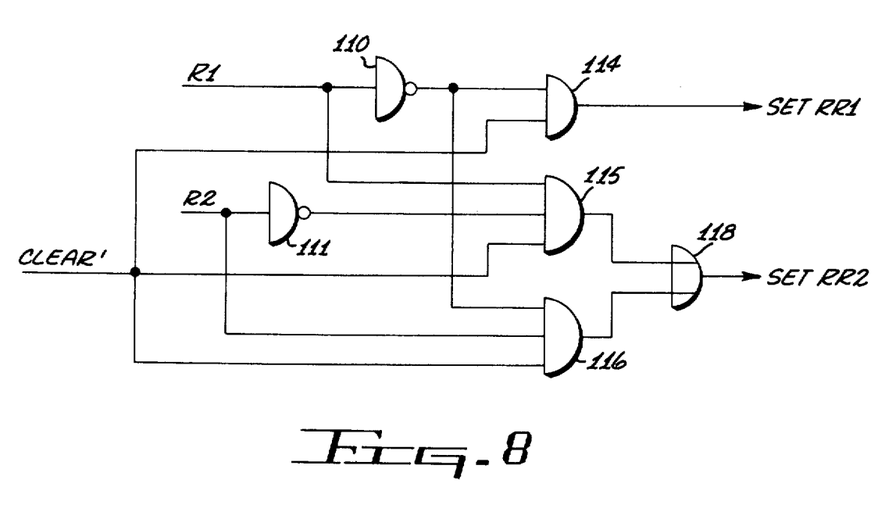
FIG. 8 is a logic diagram of the binary counter of FIG. 6.

The RR1 and RR2 signals are the pointer signals which set the level section of the tag directory and the AND-gates 71 and 72 and OR-gates 37 and 38, see FIG. 5, provide the two address signals, CA and CB for the cache store 10. The RR1 and RR2 signals are produced by the group of gates 110, 111, 114, 115, 116 and 118 of FIG. 8. The column location signals A–D are produced by 2 to 4 decoder 93 which along with effective address signals ZC10–15 provide the address of a given block; i.e., its column and level in the tag directory 28. The column location signals A–D are directed to the level selector 25 (see FIG. 4) controlling the entry of the signals AL0–08 into the tag directory 28. The updated set RR1-RR2 signals point to the block of the corresponding column of the tag directory that is to receive the next address of the data information to be stored in the cache store. On a CLEAR or INITIALIZING operation the RR1 and RR2 signals from all of the bit memory units are cleared to zero. Subsequently, as data information is placed in the cache store, the address of the tag is placed in the tag directory and the round robin counter increments the R1-R2 signals applied to it. A high value of A output signal causes the stored address signals AL00-08 to be placed into the A level of the column corresponding to the effective address signals ZC10-15 (see FIG. 4). At the same time, referring to FIG. 6, the effective address signals ZC9-15 activate the associated six-bit storage unit and to set the first full/empty bit Li. On the next cache store write operation addressing the same column of the tag directory, the tag of the address signals will be placed into the B level of the addressed column.

The indication of valid data in the cache store is accomplished by effecting the generation of the MATCH signal from the comparator 29, see FIG. 4. The CC1 signal from comparator No. 1 is enabled only if the L1 signal is enabled showing that a valid address data exists in the A level or block of the column whose address corresponds to signals ZC09-ZC15 and that the signals to the comparator do match. The CC2 signal from comparator No. 2 is enabled only if the L2 signal is enabled showing that valid address data is stored in the B level and that the signals to the comparator do match. The CC3 signal from comparator No. 3 is enabled only if the L3 signal is enabled showing that valid address data is stored in the C level. The CC4 signal from comparator No. 4 is enabled only if the L4 signal is enabled showing that valid address data is stored in the D level. The actual implementation of the logic in controlling the comparator 29 by the L1–L4 signals is obvious and is not shown in detail here. The binary bit storage unit associated with the tag directory column is addressed by the same address signals as the columns and therefore the output signals from both are available at the same time.

To clear all of the cache store 10 the only requirement is to reset all of the L1, L2, L3 and L4 locations on the six-bit storage units, that is, full/empty signals L1-4 are all low or disabled. All four full/empty signals in a low condition designates that no valid data is contained in a particular column by preventing an output from comparator 29. All six bits in the storage unit 43a and 43b are cleared to zeros by an initializing signal after a turn on operation or after a clear operation so all of the data in the cache store effectively becomes nonvalid data information.

Figure 7:
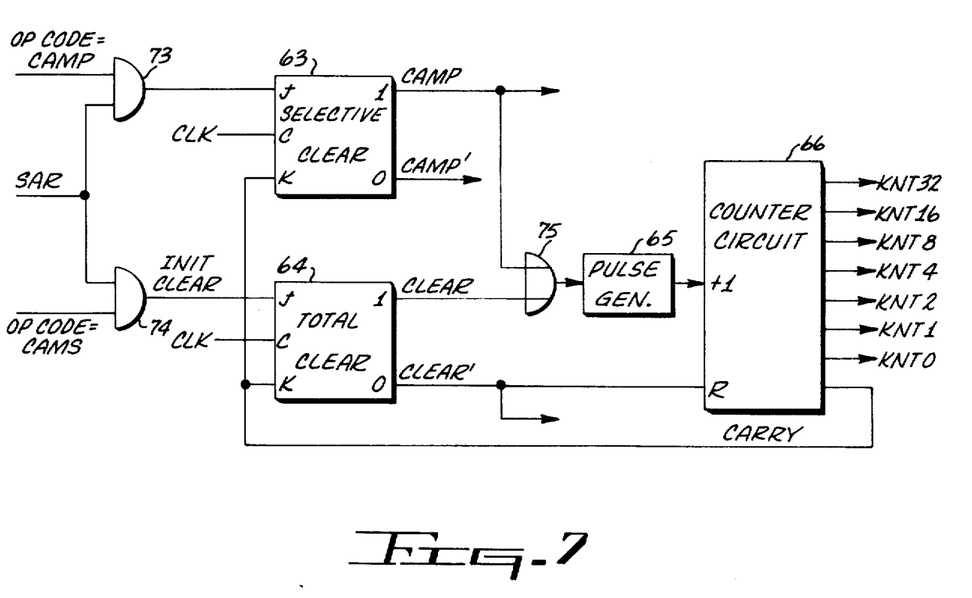
FIG. 7 is a logic diagram of a cache store clearing circuit controlled by processor operations and controlling the indicator apparatus of FIG. 6.

Referring to FIG. 7 for the clearing apparatus on an initialized clear INIT CLEAR signal, a flip-flop 64 is set to enable the CLEAR signal. The CLEAR signal is directed to a pulse generator 65 and to the 3 to 8 decoder 50 on FIG. 6. The output of the pulse generator 65 is directed to the ADD 1 input of the counter circuit 66. The output of the counter circuit 66 are the clear address signals KNT0-32 which are directed to the four address OR-gates 45–48 and to the OR-gates 52–54 of FIG. 6. The counter 66 provides an address count from zero through 16 to address the storage units of the memory chip of FIG. 6 each time the pulse generator 65 emits an enabling signal. While enabled, pulse generator 65 emits a continuous stream of pulses each separated in time by the time required to reset a store unit. Upon reaching a count of 16, a CARRY signal is enabled by the counter circuit 66. The CARRY signal is directed to the reset K terminal of the flip-flop 64 to reset the clearing operation and again enable the CLEAR' signal.

The INIT CLEAR signal activating the CLEAR operation is derived from the SAR and CAMS signals which are directed to AND gate 74. The SAR provides the appropriate timing signals for the clearing operation.

Referring again to FIG. 6, the CLEAR signal applied to the 3 to 8 decoder 50 enables all of the chip select signals CHSEL 1–8. Therefore, as each count from zero to 16 is developed by the counter circuit 66 to enable the KNT 0–4 signals, all of the 128 storage units on the eight memory chips are cleared at one time. The SET 1–4 signals are all disabled by the CLEAR' applied to AND-gate 77 of the modified increment counter 55. Thus, after the counter curcuit 66 counts 16 counts, the entire cache store 10 is effectively cleared by clearing the round robin and full/empty bits of each storage unit thereby making all of the data information in the cache store invalid information.

The complete clearing of the tag directory in the cache store is performed by merely resetting the full-/empty flag bits. When the round robin pointer signals are reset, they point to the A level of the corresponding column of the tag directory.

Very high speed integrated circuits packages are used for implementation of the cache store 10 as well as the other store units, such as the tag directory 28. The cache store address, see FIG. 3, directs the addressing of the particular circuit package along with a particular word or part of a word from each package. The particular addressing of the integrated circuit packages is well known in the art and will not be further explained here.

When it is desired that only a portion of the cache memory be cleared the processing unit 7 of FIG. 1 provides a CAMP OP code or CAMP signal and the address of the page to be cleared from the cache section 11 of FIGS. 1 and 2. The CAMP signal is applied to the incrementer 24 which is shown in more detail in FIG. 7. The absolute address of the page to be cleared is contained in the ALOO-08 signal which is coupled to the input of comparator 29 of FIGS. 2 and 4. At this same time the KNT 0-32 signals cause the contents of each of the columns of directory 28 to be sequentially applied to comparator circuits Nos. 1–4 of comparator 29 shown in FIG. 4. For example, on the first count when KNT0-32 = 0 causes the data from block AO, BO, CO and DO to be applied to a corresponding one of the comparator circuits 1–4. These signals applied to the comparaton circuits 1–4 are compared against the signals ALOO-08 and if there is a match the signals CC1–CC4 are developed at the output of any of these circuits which do find a match. These signals CC1–4 are coupled to the selective clear circuit 55 shown on FIG. 6. If a match occurs in comparator circuit No. 1 of FIG. 4 comparator circuit No. 1 develops the CC1 signal which is inverted and coupled to gate 83 of the selective clear circuit 55. The CC1' signal is coupled through gates 83 and 88 causing the L1 bit to be reset in the corresponding six-bit storage unit 43a. When the L1 bit of storage unit 43a is reset this indicates that the corresponding block in the cache store 10 of FIG. 4 contains invalid data available for storing new data words from the backing memory store 4 of FIG. 1. In a similar manner when the comparator circuit No. 2 of FIG. 4 supplies a CC2' to the selective clear circuit 55 of FIG. 6 the signal is coupled through gate 84 and gate 89 causing L2 of the storage unit 43a to be reset.

When it is desired that only selective blocks of the cache memory be filled with fresh data and that data in the other blocks remain untouched the skip count circuitry and the count adjust circuit 95 of FIG. 6 are used. These circuits would normally be used after some of the blocks, but not all, have been cleared of data and it is desired to do a "block load" of data into a series of blocks in the tag directory 28 and in the cache store 10. The skip count circuit includes a pair of OR-gates 96 and 97 and a plurality of AND-gates 99–102 and 135–138. In a normal load blocks A through D of a given column would be sequentially loaded. After a selective clear, some of the blocks in the directory and cache may be empty and some may be full. In such a circumstance the skip count circuit causes the empty blocks to be loaded and causes the loading circuitry to skip the blocks that have valid data already in them. For example, if L2 and L3 of storage unit 43a are high; i.e., valid data is stored in the corresponding blocks of cache store 10 and L1 and L4 are low the sequence of operation would be as follows. If the loading starts at block 40, the sequence for setting L1 is as described above. The next step would normally be to have signal B from the decoder 93 supply a signal which would set L2. However, since L2 is already set, L2 is applied to AND-gate 100 of the skip counter, signals RR1' and RR2 from counter 94 are applied to the AND-gate 136, thereby providing a signal to the lower input lead of gate 100. At this same time the signal L4' is coupled through gate 96 thereby enabling AND-gate 100 so that a signal is coupled through gate 97 to the input lead of the count adjust circuit 95.

Figure 9:
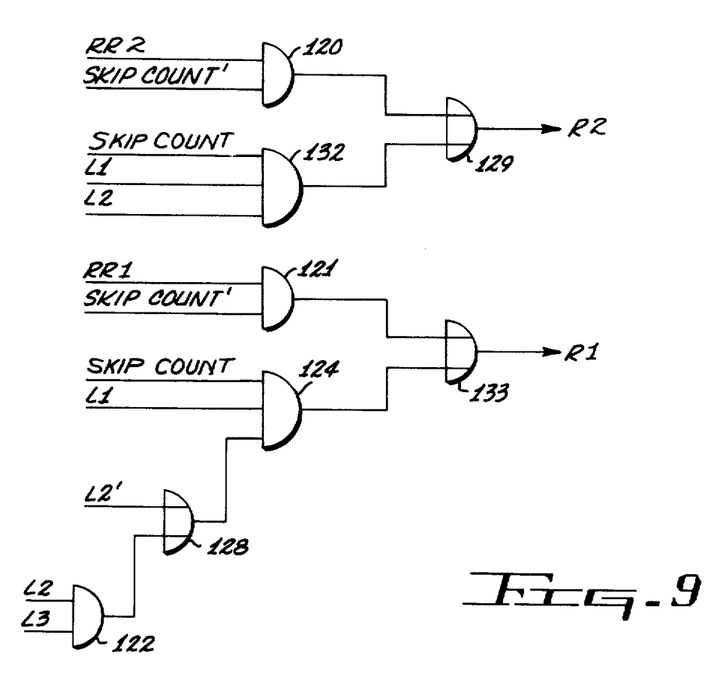
FIG. 9 is a logic diagram of the count adjust circuit of FIG. 6.

Details of the count adjust circuit 95 are shown in FIG. 9. The skip count signal and signals L1 and L2 are applied to AND-gate 132 of FIG. 9 thereby causing a signal to be coupled through OR-gate 129 to provide an R1 signal to the binary counter 94 of FIG. 6. The R1 signal causes the binary counter to skip to the next count. Since L2 of memory unit 43a is set the L2 signal from the storage unit is applied to the center lead of AND-gate 101 in the skip counter circuit. The counter 94 provides RR1 and RR2' signals to the AND-gate 137 which couples a signal to the lower lead of gate 101. These signals and the L4' signal from OR-gate 96 enable gate 101 so that a skip count signal is again applied to the count adjust circuit 95 of FIGS. 6 and 9. The skip count signal applied to AND-gate 124 enables gate 124. At the same time signals L2 and L3 applied to AND-gate 122 are coupled through OR-gate 128 to the lower input lead of AND-gate 124, thereby causing gate 124 to couple a signal through OR-gate 133 to the output lead R2. The signal R2 applied to the input lead of binary counter 94 of FIG. 6 causes counter 94 to skip another count thereby setting L4 of storage unit 43a.

While the principles of the invention have now been made clear in an illustrative embodiment, there will be many obvious modifications of the structure, proportions, materials and components without departing from those principles. The appended claims are intended to cover any such modifications.

What is claimed is:

1. In a virtual memory data processing system including a backing memory store into which data words of k bits can be written and subsequently read, the absolute address of a data word being its actual address in the backing store, the data words being arranged into pages of not more than j data words per page, and the pages of data words being organized into segments;

a central processing unit operatively connected to the backing memory store to receive data words from the backing store, said processing unit including means responsive to the receipt of an instruction data word from the memory store for decoding the instruction to produce control signals; a page associative store; circuit means responsive to control signals for storing in the page associative store the base address of each page of data words stored in the backing memory store; a segment associative store; circuit means responsive to control signals for storing in the segment associative store the address in the page associative store of the base address of each segment stored in the backing store; circuit means responsive to control signals for applying a given page and a given segment address to the page and segment associative stores; said page and segment associative stores responsive to a given page and a given segment address being applied to them respectively producing the base address in the backing memory store of the page designated by the given segment and page address; a communication control unit; circuit means for applying control signals, the base address of a page from the page associative store, and a relative address of a data word in the page to the communication control unit; said unit in response thereto producing the absolute address of the data word in the backing store;

a cache section in said central processing unit; said cache section including a set associative tag directory having storage elements; the storage elements of said tag directory being organized into $n$ columns with each column having $m$ blocks, said tag directory adapted to store in each block the tag portion of the absolute addresses of $i$ data words; a cache store, said cache store having storage elements, said storage elements being organized into $m$ times $n$ blocks, each block of the cache store being mapped to a block of the tag directory; each block of the cache store adapted to store $i$ data words, the high order portion of the absolute addresses of the $i$ data words being the tag, the intermediate order portion being the column number of the tag directory in which the tag is stored; circuit means responsive to control signals for storing the tag portion of $i$ data words received from the backing memory store into a block in a column of the tag directory corresponding to the intermediate order portion of the absolute address of said $i$ data words, and for storing said $i$ data words into the block in the cache store mapped to the block and column into which the tag of said $i$ data words is stored; comparator circuits, circuit means for applying the tag portion of the absolute address of a given data word to the comparator circuits and the tags stored in the blocks of the column corresponding to the intermediate order portion of said given word, said comparator circuits producing a comparison signal if the tag of said given word is identical to a tag stored in a block in the corresponding column of the directory; said comparison signal signifying that the given data word is stored in the block in the cache store mapped to the block in the tag directory storing the identical tag; and if no comparison signal is produced the given data word is not stored in the cache store; the improvements comprising:

$n$ addressable storage units; one storage unit associated with each of the $n$ columns of the tag directory; each of said storage units having storage elements, each storage element having two states, $p$ storage elements for storing $p$ pointer signals where $p$ is defined by the equation, $2^p=m$, the pointer signals stored in a storage unit designating the block in the corresponding column of the tag directory into which a tag is to be written, and $m$ storage elements for storing full/empty status signals, one for each block of the corresponding column of the tag directory, each of said $m$ storage elements denoting in the second of its two states that a tag is stored in the corresponding block of the tag directory and that data words having an absolute address the higher order bits of which are the tag and the intermediate order of bits the column number in which the tag is stored, are stored in the corresponding block in the cache store, and in its first stage that a tag is not so stored;

a binary counter circuit for incrementing by one pointer signal applied to it, circuit means for applying the pointer signals of the addressable storage unit to the binary counter circuit responsive to a tag being written into a block designated by the pointer signals in the column of the tag directory with which an addressable storage unit is associated;

circuit means for applying the incremented pointer signals to the associated storage unit for storage by the pointer signal storage elements; circuit means responsive to a tag being written into a block in a column of the tag directory for placing the corresponding storage element of status signals of the corresponding addressable storage unit into its second state; and circuit means responsive to a clear associative memory page control signal from the means for decoding an instruction and the tag portion of the absolute address of the page to be cleared being applied to said circuit means for causing the tag directory to compare the tag stored in each block of the tag directory with the tag of the page to be cleared and for placing all storage elements of status signals of the addressable storage units whose tags are identical with the tag of the page to be cleared into their first state, whereby all data words of a given page stored in the cache store are effectively cleared from the cache store.

2. A virtual memory data processing system as set forth in claim 1 including a count adjust circuit to which the pointer signals and full/empty status signals are applied from an addressable storage unit for adjusting the pointer signals to designate a block in the column of the tag directory where corresponding storage element for status signals is in its first state and for applying the pointer signals so adjusted to the binary counter circuit.

3. A virtual memory data processing system as set forth in claim 2 including circuit means responsive to a clear associative memory segment control signal from the means for decoding instructions for placing the storage cells of pointer signals and status signals of all of the addressable storage units in their first state, whereby the cache store is effectively cleared of all data words.

4. A virtual memory data processing system as set forth in claim 1 in which $k=36$, $j=1024$, $n=128$, $m=4$ and $i=4$.

5. A virtual memory data processing system comprising: a backing memory store into which data words of $k$ bits can be written and subsequently read, the absolute address of a data word being its actual address in the backing store, data words being arranged into pages of not more than $j$ data words per page, and the pages of data words being organized into segments;
- a central processing unit; circuit means connecting the central processing unit and the backing memory store so that the processing unit can write data words into and fetch data words from the backing memory store;
- means in the processing unit responsive to the receipt of an instruction data word from the backing memory store for decoding the instruction to produce control signals;
- a page associative store in the processing unit; circuit means responsive to control signals for storing in the page associative store the base address of each page of data words stored in the backing memory store;
- a segment associative store in the processing unit; circuit means responsive to control signals for storing in the segment associative store the address in the page associative store of the base address of each page of each segment stored in the backing store; circuit means responsive to control signals for applying a given page and a given segment address to said page and segment associative stores respectively, said segment and page associative stores responsive to the application of given segment and page addresses being applied to them producing the base address in the backing memory store of the page designated by the given segment and page addresses;
- a communication control unit in the processing unit; circuit means responsivve to control signals for applying the relative address of a data word in the designated page, the base address of the designated page from the page associative store to the communication control unit, said unit in response thereto producing the absolute address of the data word in the backing store; and
- a cache section in the processing unit; said cache section comprising;
- a set associative tag directory having storage elements; the storage elements of the tag directory being organized into $n$ columns with each column having $m$ blocks; said tag directory adapted to store in each block the tag portion of the absolute addresses of $i$ data words;
- a cache store; said cache store having storage elements, said storage elements being organized into $m$ times $n$ blocks of storage elements, each block of the cache store being mapped to a block of the tag directory, each block of the cache store adapted to store $i$ data words, the high order portion ofo the absolute addresses of the $i$ data words being the tag, the intermediate order portion being the column number of the tag directory in which the tag is stored; circuit means responsive to control signals for storing the tag portion of the absolute addresses of $i$ data words received from the backing memory store into a block in a column of the tag directory corresponding to the intermediate order portion of the absolute address of said $i$ data words, and for storing said $i$ data words into the block in the cache store mapped to the block of the tag directory into which the tag of said $i$ data words is stored; comparator circuits; circuit means responsive to control signals for applying to the comparator circuits the tag portion of the absolute address of a given data word and the tags stored in the blocks of the column of the tag directory corresponding to the intermediate order portion of said given word, said comparator circuits producing a comparison signal if the tag of said given word is identical to a tag stored in a block in the corresponding column of the directory, said comparison signal signifying that the given data word is stored in the block in the cache store mapped to the block in the tag directory in which is stored the identical tag; and if no comparison signal is produced the given data word is not stored in the cache store;
- $n$ addressable storage units, one storage unit associated with each of the $n$ columns of the tag directory, each such storage units having storage elements, each storage element having two states, $p$ storage elements for storing $p$ pointer signals where $p$ is defined by the following, $2^p=m$, the pointer signals stored in the storage elements of a storage unit identifying the next block in the corresponding column of the tag directory into which a tag is to be written, and $m$ storage elements for storing full-/empty status signals, one for each block of the corresponding column of the tag directory, each of said $m$ storage elements denoting in the second of its two states that a tag is stored in a corresponding block of the tag directory, and in its first state that a tag is not so stored;
- a binary counter circuit for incrementing by one pointer signals of an addressable storage unit;
- circuit means for applying pointer signals from an addressable storage unit to the binary counter responsive to a tag being written into a block in the column of the tag directory with which the addressable storage unit is associated which block is identified by said pointer signals;
- circuit means for applying the incremented pointer signals to the pointer signal storage elements of the associated storage unit for storage;
- circuit means responsive to a tag being written into a block in the column of the tag directory for placing the storage element of status signals of the corresponding addressable storage unit into its second state;
- and circuit means responsive to a clear associative memory page control signal from the means for decoding an instruction data word and the tag portion of the absolute address of the page to be cleared for causing the tag directory to compare the tag stored in each block of the tag directory with the tag of the page to be cleared and for placing all storage elements of status signals of the addressable storage units whose tags are identical with the tag of the page to be cleared into their first state, whereby all data words of a given page stored in the cache store are effectively cleared from the cache store.

6. A virtual memory data processing system as set forth in claim 5 including a count adjust circuit to which the pointer signals and full/empty status signals are applied from the addressable storage unit for adjusting the pointer signals to identify a block in the column of the tag directory whose corresponding storage element for status signal is in its first state and for applying the pointer signal so adjusted to the binary counter circuit.

7. A virtual memory data processing system as set forth in claim 6 including circuit means responsive to a clear associative memory segment control signal from the means for decoding instructions for placing the storage cells of pointer signals and of status signals of all the addressable storage units in their first state, whereby the cache store is effectively cleared of all data words.

8. A virtual memory data processing system as set forth in claim 5 in which $k=36$, $j=1024$, $n=128$, $m=4$ and $i=4$.

* * * * *